Patented Mar. 19, 1929.

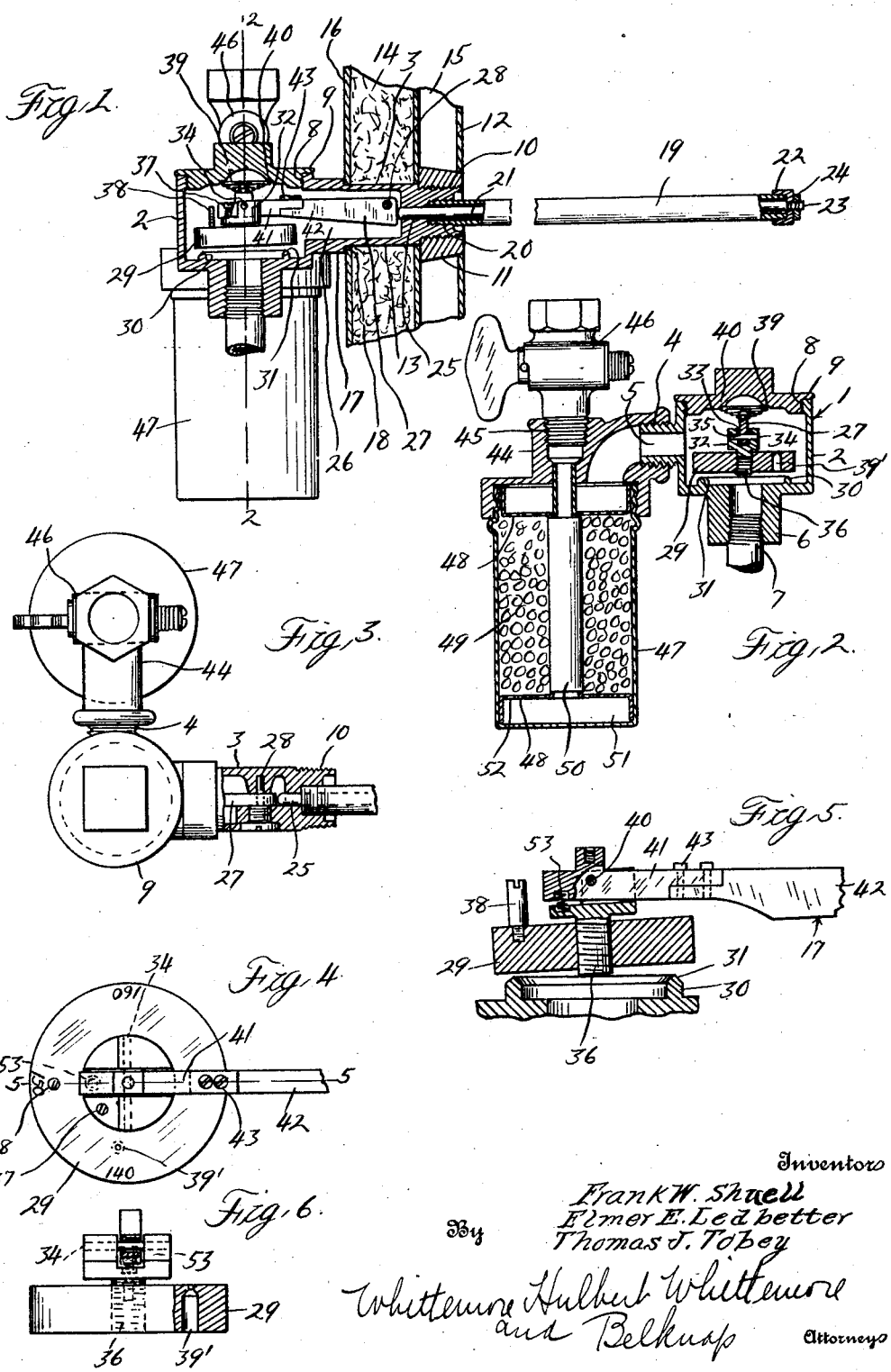

1,705,787

UNITED STATES PATENT OFFICE.

FRANK W. SHUELL, ELMER E. LEDBETTER, AND THOMAS J. TOBEY, OF DETROIT, MICHIGAN, ASSIGNORS TO THE EVERHOT HEATER COMPANY, OF DETROIT, MICHIGAN, A CORPORATION OF MICHIGAN.

THERMOSTATIC GAS REGULATOR.

Application filed January 24, 1927. Serial No. 163,222.

The invention relates to thermostatic gas regulators and is particularly adapted for use in connection with an automatic water heater.

The primary object of the invention is to provide a mechanism of simple construction, which is positive in action and effective to variably regulate the flow of gas to the burner according to the varying temperature of the water adjacent the thermostatic element.

Another object is to provide improved means for adjusting the device to maintain the water in the boiler at any predetermined temperature.

A further object is to prevent fluttering or chattering of the valve and also to prevent snap action of the valve.

A further object is to obtain a construction in which the lever mechanism is housed within a shank projecting from the valve housing and means is provided for readily removing the valve without disturbing the fulcrum of the lever mechanism or the thermostatic element.

These and other objects are attained by providing the novel construction hereinafter described and illustrated in the accompanying drawings, wherein:—

Figure 1 is a longitudinal section through the regulating device;

Figure 2 is a section at right angles thereto on the line 2—2 of Figure 1;

Figure 3 is a top plan view partly in section;

Figure 4 is an enlarged plan view of the disk valve;

Figure 5 is a section on the line 5—5 of Fig. 4.

Figure 6 is a view at right angles to Fig. 5.

Referring now to the embodiment of our invention illustrated in the drawings, 1 represents the housing for the regulating mechanism which as shown includes an annular hollow portion 2 and a laterally extending shank 3, preferably formed integral therewith. The housing is formed with the laterally extending threaded boss 4 which is apertured to form a gas inlet 5 and is also formed with a downwardly projecting boss 6 apertured to form the gas outlet 7. The upper end of the annular portion of the housing has a threaded opening 8 therein which is normally closed by a removable cap 9. The shank 3 has a threaded inner end 10 for engaging a spud 11 welded to the inner boiler shell 12 and the shank also has the cylindrical portion 13 extending through the insulation 14 of the hot water heater, this insulation being arranged between the inner jacket shell 15 and the outer jacket shell 16. The shank also has the enlargement 17 forming a shoulder 18 for engaging the outer jacket shell 16.

The thermostat comprises an outer tube 19 threadedly secured at 20 to the shank 3 and secured at the opposite end to an inner rod 21 in any suitable manner. The tube 19 and rod 21 are composed of materials having different coefficients of expansion and in the preferred form the outer tube is formed of copper, while the inner rod is made of invar steel. In order to permit of initially adjusting the thermostat, there is provided a tube cap 22 threadedly secured to the tube 19 and apertured to receive the threaded end 23 of the inner rod, which in turn is secured to the cap by a nut 24. Thus to adjust the thermostat to any desired initial setting, the inner rod 21 is rotated by means of a screw driver until the desired longitudinal adjustment is obtained, whereupon the nut 24 is turned to lock the parts in adjusted position and the joint made permanent by soldering.

The inner end of the rod 21 projects through the passageway 25 into the hollow interior 26 of the shank 3 where it bears against a lever 27. The lever 27 is fulcrumed on a pin 28, the axis of which is slightly above the center line of the rod 21, thus providing for a relatively small lever arm effective in operating the lever. The lever extends longitudinally of the shank 3 and projects into the interior of the annular portion 1 of the valve casing. Carried by the free end of the lever 27 is a disk valve 29 which is arranged to seat on an upstanding ring 30 surrounding the gas outlet 7. This ring is preferably formed with a knife edge 31, which, cooperating with the smooth under surface of the valve 29, provides an effective means for shutting off the gas supply and has the further advantage that the dirt or other solid matter cannot collect on the seat to prevent tight closing of the valve.

In order to insure proper seating of the valve upon the annular valve seat, it is desirable to provide a universal pivot between the valve and the lever 27. For this purpose there is provided a yoke 32 having a slot 33 for receiving the end of the lever 27 and the members are connected by a pin 34, which is secured to the yoke and passes through an aperture 35 in the lever. Thus the valve is permitted to swivel about the axis of the pin 34 in the plane of the lever, and it is also permitted to swing in a transverse plane by providing a slight clearance between the pin and the aperture 35. This will insure accurate seating of the valve on the valve seat.

The yoke 32 has a threaded shank 36 for engaging the disk valve 29 and the valve is normally held against rotation by a set screw 37 which extends through the yoke and bears against the upper face of the disk. In order to adjust the mechanism to close at different temperatures within the water tank, the valve 29 may be rotatably adjusted on the threaded shank 36 and to aid in this adjustment there is provided an upstanding pin 38, which may easily be actuated when the cap 9 is removed. Preferably the valve is provided with calibrations on the upper face thereof which are so calculated as to indicate directly the temperature for which the valve mechanism is set when in any predetermined position of relative adjustment.

It is desirable that the regulating mechanism be capable of operating to gradually open and close the valve according to variations in the temperature of the thermostat, and to avoid any possible sudden or snap action of the valve a spring 39 is provided which continuously urges the valve toward its closed position. As shown, this spring is a conical coiled spring, the large end of which is arranged in an annular recess 40 in the cap 9 and the small end of which bears on the lever 27. By arranging the spring to exert pressure directly on the valve—that is, in alignment with the axis of the valve—it serves to counteract any spring action in the lever mechanism and thus avoids snap action of the valve. The spring of course also has the further function of always urging the valve toward closed position, but the mechanism does not depend upon the spring alone for this function since the weight of the valve and lever mechanism also tends to close the valve.

There is a particular advantage in combining the spring actuated and gravity actuated features in one mechanism, since by making the valve disk 29 of greater weight than would be necessary simply for closing the gas outlet, it is possible to use a spring of less tension than would otherwise be the case. It must be remembered that the valve and lever mechanism must have sufficient freedom of movement to permit the valve to respond to the thermostat when the latter is under the lowest temperature conditions to which it can ever be subjected. While the device is normally intended to function only at the temperatures obtainable in a water boiler, nevertheless it must be so designed as to be capable of withstanding temperatures below zero on the Fahrenheit scale, because it may be subjected to these temperatures while in storage or in shipment. Thus the spring must be capable of permitting a considerable movement of the valve before it reaches collapsed position, and this means that in normal operation of the device the spring will be considerably extended and thus operating at a tension which is considerably less than the tension when in collapsed condition. By combining the weighted valve with the spring it is only necessary to provide in the spring sufficient tension to insure that it counteracts all spring inherent in the lever mechanism, and the remaining force necessary for urging the valve toward closed position can be obtained by properly determining the weight of the valve. The weighted valve also has another function in that it increases the inertia of the moving parts and thus tends to prevent fluttering of the valve when it is adjacent the valve seat. For the reasons given above the valve 29 is preferably of relatively great thickness so as to introduce the desired weight element into the device. The valve is preferably, though not necessarily, made of brass and is provided with a small pilot orifice therethrough for always allowing a certain quantity of gas to pass through the valve even when in closed position. This pilot orifice is preferably formed by providing a bore 39' in the under side of the valve 29 which terminates a short distance from the upper surface of the valve. The remaining metal between the bore 39 and the upper surface is then provided with a drilled aperture, preferably of very small diameter, the exact size being predetermined in order to provide an orifice of the proper calibration to operate the pilot light of the burner.

As stated above the shank 3 of the housing extends through the insulation of the boiler and is secured to the inner boiler shell, thus forming a water seal. The shank is also integral with the annular housing for the valve mechanism, which makes it inadvisable to remove the housing from the boiler. In order to permit the removal of the valve mechanism for cleaning, adjustment or other purposes, the lever 27 is preferably formed of two parts 41 and 42, the line of division being in substantial alignment with the threaded opening 8 in the housing. The two portions of the lever are rigidly connected together by means of the screws 43, which are so located as to be accessible when the cap 9 is removed. Thus by removing the cap 9 and the screws 43, the valve 29 and its associated parts can be readily removed from the housing, leaving the pivoted end 41 of the lever permanently secured to the housing.

It is to be noted in this construction that the thermostat and lever mechanism are arranged in substantial alignment and that the lever mechanism involves only a single lever. The ratio of the lever arms of the lever may of course be selected as desired, but in the apparatus as illustrated the leverage is twenty to one. It will also be noted that the single lever is housed for the greater part of its length in the hollow shank which extends within the boiler structure thereby obtaining a very compact structure.

In Figure 2 there is shown a gas filter associated with the mechanism above described, this filter comprising a casting 44 threadedly engaging the threaded boss 4 and having an inlet opening 45 for threadedly receiving a gas cock 46. The filter is provided with a filter cup or casing 47 secured to the casting 44 and having upper and lower retainers 48 between which is placed the material forming the filter bed 49. The gas is conducted from the gas cock 46 through a conduit 50 extending through the filter bed to a sediment chamber 51 within the lower retainer 48. The gas then passes upwardly through perforations 52 in the retainers through the filter bed and into the gas inlet 5 of the valve mechanism.

The apparatus as above described is preferably assembled as a unit and is then calibrated to respond to a certain predetermined temperature of the thermostat. In carrying out the calibration the valve 29 is adjusted to indicate a certain predetermined temperature and the thermostatic element is then placed in a bath maintained at said temperature and the rod 21 is adjusted until the valve 29 just engages the valve seat. When this condition is obtained the lock nut 24 is tightened and the thermostat is then preferably permanently fixed in this adjusted position by soldering.

In the commercial production of the regulating device as above described it has been found that in some instances there is a slight hum in the mechanism when the valve is closely adjacent the valve seat, but not quite in firm engagement therewith. This may be eliminated entirely by providing means for manually holding the valve at a slight angle to the plane of the valve seat so that one side of the valve comes in contact with the seat before the other side. Therefore it is preferable to employ a tiny spring between the lever 27 and the yoke 32 arranged on one side of the axis of the valve. As shown in Figure 5, a coil spring 53 has one end thereof inserted in a recess 54 in the outer end of the lever 27 and the other end inserted in a recess 55 in the yoke 32. The slight tension of the spring results in the tilting of the disk valve until the right side of the yoke contacts with the under side of the lever. When the thermostat permits the valve to move towards closed position, one side of the valve comes into engagement with the seat before the other and this prevents any noise in the mechanism no matter in what position the valve is adjusted.

What we claim as our invention is:

1. A gas regulator for water heaters comprising a casing having a gas inlet port, a gas outlet port at the bottom portion thereof and an annular ring surrounding said outlet port forming a valve seat, said casing having a horizontally projecting hollow shank, a single lever pivoted to said shank having a long arm extending horizontally within the shank, and a short arm extending transversely thereof, a disk valve depending from and pivotally carried by the long arm, a cap of larger diameter than said valve arranged above said valve, and a spring between said cap and valve arranged to urge the latter toward closed position.

2. A gas regulator for water heaters comprising a hollow valve casing having inlet and outlet ports, a valve seat surrounding said outlet port, a disk valve adjacent said valve seat, a hollow shank extending laterally of said valve casing, a lever pivoted to said shank and extending within the same towards said valve casing, a separate member removably secured to said lever and pivotally connected to said valve, said casing having an aperture arranged to permit removal of said valve and said separate member as a unit, and a cap for closing said aperture.

3. In a gas regulator for water heaters, the combination with a valve casing having a laterally extending shank projecting therefrom, of a lever pivoted to said shank and extending within the same toward said valve casing, said casing having an opening therein, a cap for said opening, a separate member within said valve casing removably secured to said lever and forming a continuation thereof, and a valve pivotally connected to said separate member and adapted to be removed therewith through the opening in said valve casing.

4. A gas regulator for water heaters comprising a casing, a valve seat, a lever, means responsive to temperature changes for moving said lever toward and away from said valve seat, a disk valve pivotally mounted on the lever, and a spring between said lever and valve offset from the axis of the latter and adapted to normally maintain said valve at an inclination to the valve seat.

In testimony whereof we affix our signatures.

FRANK W. SHUELL.
ELMER E. LEDBETTER.
THOMAS J. TOBEY.